United States Patent
Oroskar et al.

(10) Patent No.: US 8,203,963 B1
(45) Date of Patent: Jun. 19, 2012

(54) OVERFLOW PAGES IN HEAVILY LOADED SLOTS

(75) Inventors: Siddharth S. Oroskar, Overland Park, KS (US); Sachin R. Vargantwar, Overland Park, KS (US); Deveshkumar N. Rai, Overland Park, KS (US); Debasish Sarkar, Irvine, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 305 days.

(21) Appl. No.: 12/572,829

(22) Filed: Oct. 2, 2009

(51) Int. Cl.
*H04L 12/26* (2006.01)
(52) U.S. Cl. .................. 370/252; 370/312; 455/453
(58) Field of Classification Search .......... 370/312, 370/252, 345, 328; 455/453, 458
See application file for complete search history.

(56) References Cited

U.S. PATENT DOCUMENTS 6,665,307 B1 * 12/2003 Rydnell et al. ............... 370/437
2009/0017797 A1 * 1/2009 Li et al. ...................... 455/414.1

* cited by examiner

*Primary Examiner* — Phuoc Doan

(57) ABSTRACT

Disclosed herein are methods and systems for scheduling pages to mobile stations in a radio access network. An exemplary method involves (a) at a radio access network, determining whether or not a first load that is scheduled for transmission during a first paging period, is greater than a threshold load, (b) if the first load is greater than the threshold load, then (i) determining whether or not a second load that is scheduled for transmission during a second paging period, is less than the threshold load and (ii) if the second load is less than the threshold load, then rescheduling at least a portion of the first load for transmission during the second paging period, and (iii) otherwise, refraining from rescheduling the portion of the first load for transmission during the second paging period.

20 Claims, 5 Drawing Sheets

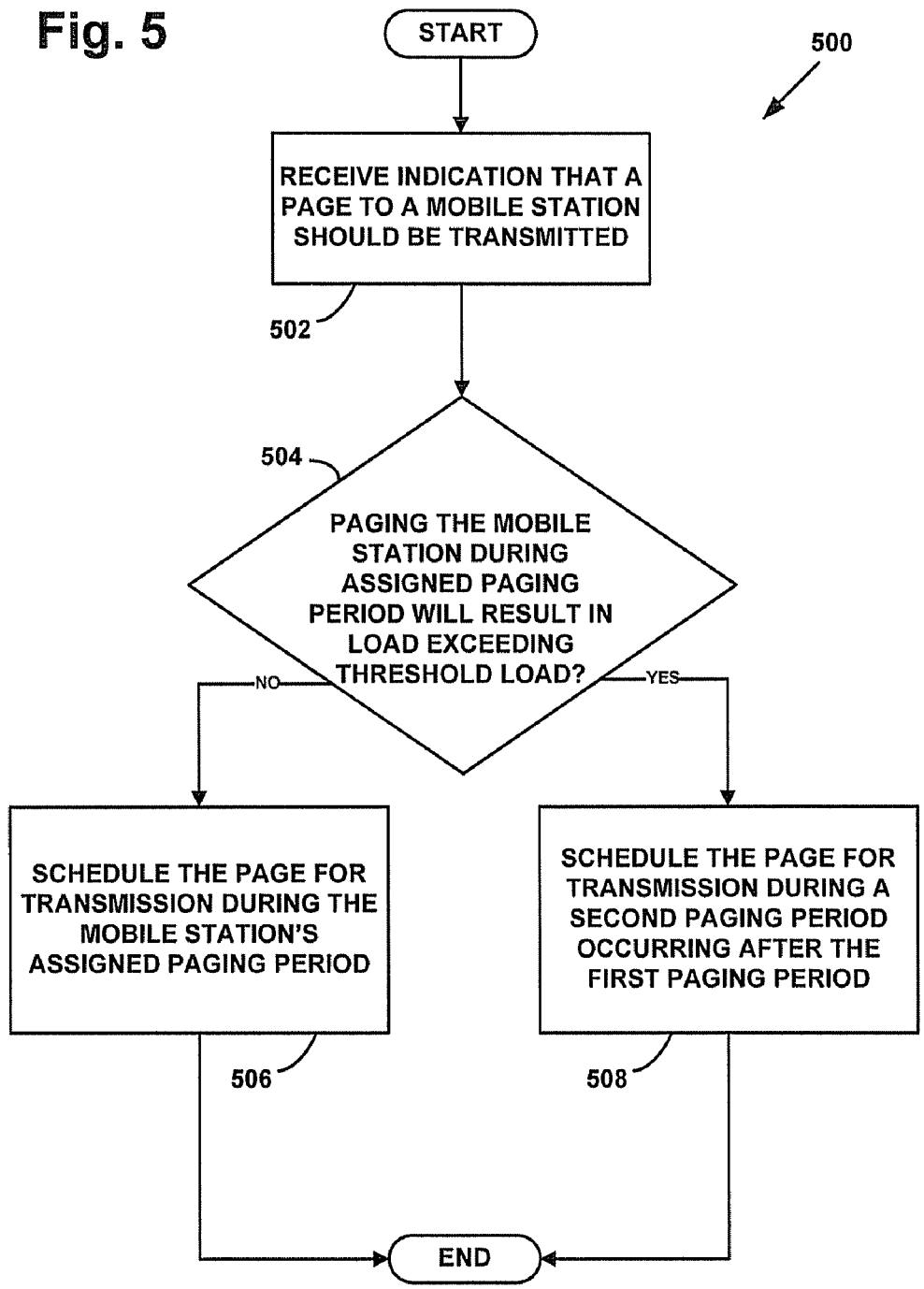

OVERFLOW PAGES IN HEAVILY LOADED SLOTS

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennas in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

When a mobile station (such as a cellular telephone, pager, or appropriately equipped portable computer, for instance) is positioned in a cell, the mobile station (also referred to as an access terminal) communicates via an RF air interface with the BTS antenna of the cell. Consequently, a communication path is established between the mobile station and the transport network, via the air interface, the BTS, the BSC and the switch or gateway. Functioning collectively to provide wireless (i.e., RF) access to services and transport in the wireless communication system, the BTS, BSC, MSC, and PDSN, comprise (possibly with additional components) what is typically referred as a Radio Access Network (RAN).

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, or by respective BTS antennas. These sectors can be referred to as "physical sectors," since they are physical areas of a cell site. Therefore, at any given instant, a mobile station in a wireless network will typically be positioned in a given physical sector and will be able to communicate with the transport network via the BTS serving that physical sector.

OVERVIEW

Mobile stations operating in a wireless communication system typically receive user data from a radio access network (RAN) via one or more traffic channels, and are paged or sent control messages via one or more paging or control channels. Under some protocols, such as IS-2000, the RAN notifies mobile stations of incoming communications by paging mobile stations over one or more dedicated paging channels. Under other protocols, such as IS-856, pages are typically sent via one or more control channels that are time-division multiplexed together with traffic channels on common "forward" channels from the RAN to mobile stations operating in a coverage area serviced by the RAN.

Under IS-2000, the paging channel is divided into paging-channel timeslots, and mobile stations are assigned certain paging-channel timeslots during which to listen for pages from the RAN. Under IS-856, both traffic-channel data and control-channel data are assembled into packets, which are then subdivided and encoded into segments that are in turn scheduled for transmission in "control-channel timeslots" of the forward channel. Timeslots bearing traffic-channel data and control-channel timeslots are interlaced with one another on the forward channel to achieve time-division-multiplexed transmission. Mobile stations operating under IS-856 are then assigned particular groups of control-channel timeslots (referred to as control-channel cycles) during which to listen for pages (and other control messages) from the RAN.

Exemplary methods and systems may be implemented in an IS-2000 and/or an IS-856 radio access network, as well is in radio access networks providing service under other air-interface protocols. In particular, while IS-2000 and IS-856 define different techniques for paging mobile stations, under both IS-2000 and IS-856, mobile stations are assigned particular periods timeslots to listen for pages (i.e., paging-channel timeslots in IS-2000 and control-channel cycles in IS-856). Furthermore, under both IS-2000 and IS-856, hashing functions (albeit different hashing functions) are used to assign particular periods to particular mobile stations. For purposes of simplicity, the term "paging period," as used herein, should be understood to include at least control-channel cycles (as in IS-856) and paging-channel timeslots (as in IS-2000). Furthermore, the term "page" should be understood to include at least pages sent according to IS-2000 and IS-856, as well as other control messages sent according to IS-856. In general, aspects of an exemplary method or system described with reference IS-2000 should be understood to apply equally in the context of IS-856, and vice versa.

During peak traffic conditions, the paging channel occupancy can reach a level where the paging channel (or control channel in IS-856) is overloaded, which may lead to "shed" of page messages (e.g., dropped and/or unsuccessful pages). Accordingly, an exemplary method may help to schedule or reschedule pages from overloaded paging periods (e.g., timeslots or cycles) to paging periods that are not as heavily loaded, thereby helping to reduce page shed and improve quality of service. An exemplary method may also provide other benefits and be of use in other scenarios as well.

In one aspect, an exemplary method involves (a) at a radio access network, determining whether or not a first load that is scheduled for transmission during a first paging period, is greater than a threshold load, (b) if the first load is greater than the threshold load, then (i) determining whether or not a second load that is scheduled for transmission during a second paging period, is less than the threshold load and (ii) if the second load is less than the threshold load, then rescheduling at least a portion of the first load for transmission during the second paging period, and (iii) otherwise, refraining from rescheduling the portion of the first load for transmission during the second paging period. Preferably, the paging periods take the form of either IS-2000 paging timeslots or IS-856 control-channel cycles.

In a further aspect, another exemplary method involves (a) at a radio access network, receiving an indication to page a mobile station, wherein the mobile station has an assigned paging period, (b) determining whether or not paging the mobile station during the assigned paging period would result in a load during the assigned paging period exceeding a threshold load, (c) if the load during the assigned paging period would exceed the threshold load, then scheduling a page to the mobile station for transmission during a later paging period occurring after the assigned paging period, and (d) otherwise, scheduling the page to the mobile station for transmission during the assigned paging period.

In a further aspect, an exemplary system comprises (a) at least one communication interface configured to page mobile stations and (b) program logic stored in data storage, wherein the program logic is executable by at least one processor to: (i) prior to a first paging period, determine whether or not a load during the first paging period exceeds a threshold load, wherein the load comprises one or more pages to mobile stations, (ii) if the load during the first paging period exceeds the threshold load, then reschedule at least a portion of the load from the first paging period to a second paging period, and (iii) otherwise, refrain from rescheduling the portion of the load.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which:

FIG. 5 is another flow chart illustrating an exemplary method, which may be used to schedule pages in a radio access network.

DETAILED DESCRIPTION

The present invention will be described by way of example with reference to Code Division Multiple Access ("CDMA") communications in general, and to IS-2000 and IS-856 communications in particular. As described below, IS-2000 applies to both circuit-cellular and packet-data communications. IS-856 applies more exclusively to packet-data communications (including, e.g., real-time voice and data applications). Under IS-2000, packet-data communications are referred to as "1X-RTT" communications, also abbreviated as just "1X." However, since IS-2000 supports both circuit voice and packet data communications, the term 1X (or 1X-RTT) is sometimes used to more generally refer to the IS-2000 air interface, without regard to the particular type of communication carried. Packet-data communications under IS-856 are conventionally referred to as "EVDO" communications. It should be understood that the present invention can apply to other wireless voice and data protocols including, without limitation, IS-95 and GSM, which, together with IS-2000 and IS-856 are considered herein, individually or in any combination, to comprise a CDMA family of protocols.

Figure 1:
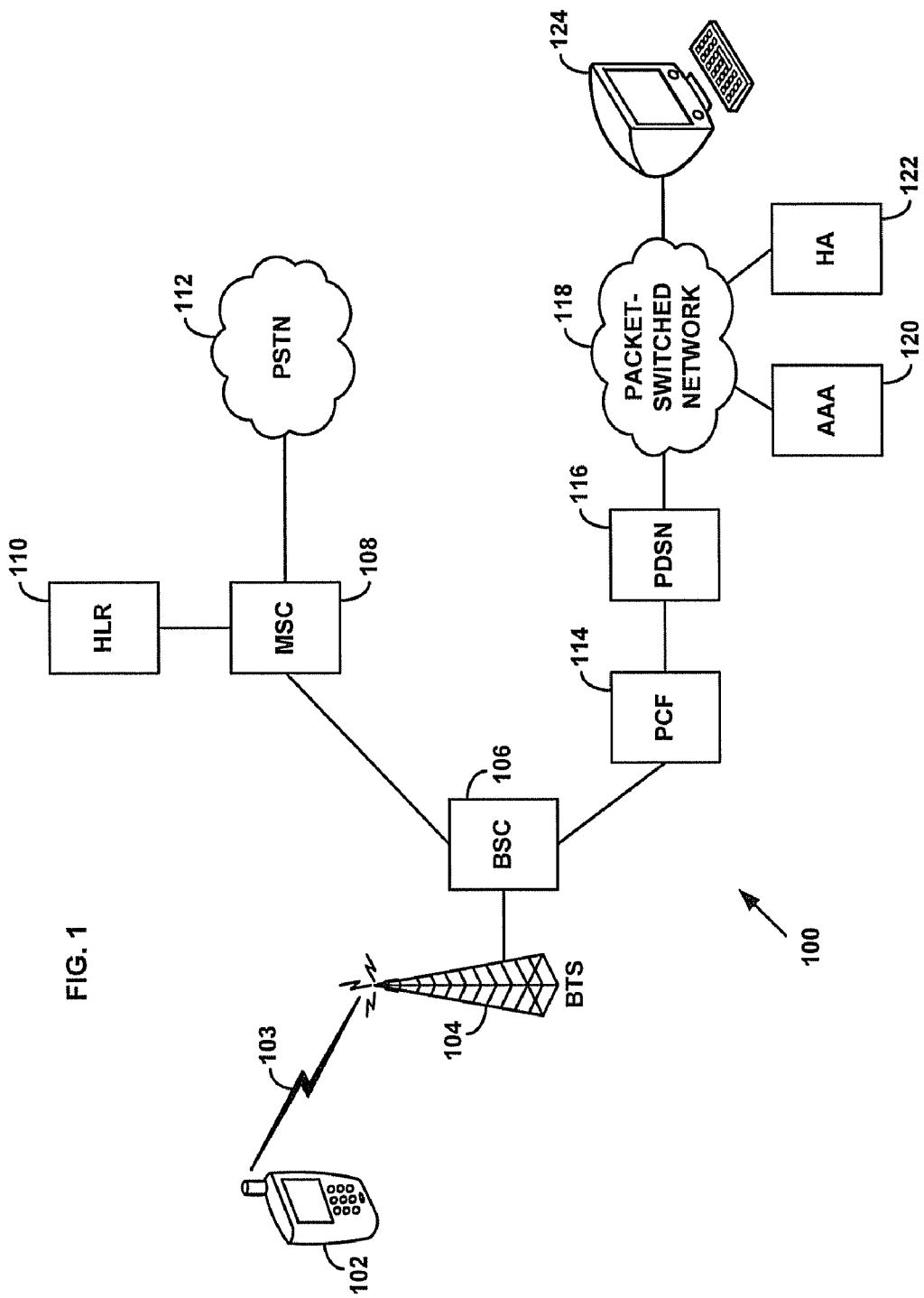
FIG. 1 is a simplified block diagram of a wireless communication system, according to an exemplary embodiment.

FIG. 1 shows a simplified block diagram of a wireless communication system 100 in which an exemplary method and system for scheduling pages to mobile stations may be employed. Mobile station 102 communicates over an air interface 103 with a BTS 104, which is then coupled or integrated with a BSC 106. Transmissions over air interface 103 from BTS 104 to mobile station 102 represent the forward link to the mobile station, while transmissions over interface 103 from mobile station 102 to BTS 104 represent the reverse link.

BSC 106 is connected to MSC 108, which acts to control assignment of air traffic channels (e.g., over air interface 103), and provides access to wireless circuit-switched services such as circuit-voice and circuit-data (e.g., modem-based packet data) service. As represented by its connection to PSTN 112, MSC 108 is also coupled with one or more other MSCs or other telephony circuit switches in the operator's (or in a different operator's) network, thereby supporting user mobility across MSC regions, and local and long-distance landline telephone services. Also connected to MSC 108 is home location register (HLR) 110, which supports mobility-related aspects of subscriber services, including dynamic tracking of subscriber registration location and verification of service privileges.

As shown, BSC 106 is also connected with a PDSN 116 by way of packet control function (PCF) 114. PDSN 116 in turn provides connectivity with a packet-switched network 118, such as the Internet and/or a wireless carrier's private core packet-network. Sitting as nodes on network 118 are, by way of example, an authentication, authorization, and accounting (AAA) server 120, a mobile-IP home agent (HA) 122, and a remote computer 124. After acquiring an air traffic channel over its air interface, a mobile station (e.g., mobile station 102) may send a request to PDSN 116 for a connection in the packet data network. Then, following authentication of the mobile station by AAA server 120, the mobile station may be assigned an IP address by the PDSN or by HA 122, and may thereafter engage in packet-data communications with entities such as remote computer 124.

With the arrangement described above, a mobile station 102 can engage in cellular voice and/or in packet-data (1X-RTT) communications. Taking an originating call from mobile station 102 as an example, mobile station 102 first sends an origination request over air interface 103 and via the BTS 104 and BSC 106 to MSC 108. The MSC then signals back to the BSC directing the BSC to assign an air interface traffic channel for use by the mobile station. For a voice call, the MSC uses well-known circuit protocols to signal call setup and establish a circuit connection to a destination switch that can then connect the call to a called device (e.g., landline phone or another mobile station). For a packet-data session, the BSC signals to the PDSN 216 by way of PCF 214. The PDSN 216 and mobile station 102 then negotiate to establish a data link layer connection, such as a point to point protocol (PPP) session. Further, the PDSN 216 sends a foreign agent advertisement that includes a challenge value to the mobile station, and the mobile station 102 responds with a mobile-IP registration request (MIP RRQ), including a response to the challenge, which the PDSN forwards to HA 222. The HA then assigns an IP address for the mobile station 102 to use, and the PDSN passes that IP address via the BSC to the mobile station.

It should be understood that the depiction of just one of each network element in FIG. 1 is illustrative, and there could be more than one of any of them, as well as other types of elements not shown. The particular arrangement shown in FIG. 1 should not be viewed as limiting with respect to the present invention. Further, the network components that make up a wireless communication system such as system 100 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as exemplary mobile station 102 typically comprises a user-interface, I/O components, a communication interface, a tone detector, a processing unit, and data storage, all of which may be coupled together by a system bus or other mechanism.

Throughout this description, the term "base station" may be used to refer to a Radio Access Network (RAN) element such as a BTS, a BSC, or combination BTS/BSC, for instance. The term "radio network controller" (RNC) can also be used to refer to a BSC, or more generally to a base station. It should be understood that actions that are generally described as being carried out by the RAN (or simply by the "network") may be carried out by various different entities or combinations of entities in the RAN. Furthermore, actions described as being carried out by one network entity may also be carried out by other network entities, without departing from the scope of the invention.

1. Exemplary IS-2000 Functionality

In a conventional CDMA wireless network compliant with the well known IS-2000 standard, each cell employs one or more carrier frequencies, typically 1.25 MHz in bandwidth each, and each sector is distinguished from adjacent sectors by a pseudo-random number offset ("PN offset"). Further, each sector can concurrently communicate on multiple different channels, distinguished by "Walsh codes." In doing so, each channel is allocated a fraction of the total power available in the sector. When a mobile station operates in a given sector, communications between the mobile station and the BTS of the sector are carried on a given frequency and are encoded by the sector's PN offset and a given Walsh code. The power allocated to each channel is determined so as to optimize the signal to noise characteristics of all the channels, and may vary with time according to the number of mobile stations being serviced, and their relative positions with respect to the BTS, among other factors.

Air interface communications are divided into forward link communications, which are those passing from the base station to the mobile station, and reverse link communications, which are those passing from the mobile station to the base station. In an IS-2000 system, both the forward link and reverse link communications in a given sector are encoded by the sector's PN offset and a given Walsh code. On the forward link, certain Walsh codes are reserved for use to define control channels, including a pilot channel, a sync channel, and one or more paging channels (depending on service demand, for example), and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

A mobile station that has no active data session or voice call (i.e., no assigned traffic channel), but is otherwise operational, is said to be in an "idle" state or mode. While in the idle state, the mobile station periodically scans the air interface for communication from the wireless communication system. More specifically, the mobile station monitors the paging channel for page messages from the base station. Page messages are used to send the mobile station information, alerts, and requests during times when the mobile station isn't engaged in any 1X-based communication (i.e., when the mobile station is idle). For instance, the mobile station is alerted of an incoming call via a page message.

In practice, a radio access network implements multiple paging channels (typically, up to seven), each subdivided into 2,048 periodically recurring, 80-millisecond (ms) slots. In order to help conserve mobile station battery power, a mobile station in the idle state monitors only certain assigned slots on a given paging channel. More specifically, a mobile station's assigned slots recur according to a "slot cycle" having a sub-period within the 2,048-slot "maximum slot cycle" period (163.84 seconds). The sub-period (slot cycle) is set according to a system parameter called the "slot cycle index." For instance, slot cycle index values of 0, 1, and 2 define slot cycles of 1.28, 2.56, and 5.12 seconds, respectively, corresponding to recurrence every 16, 32, and 64 slots per maximum slot cycle.

Within the maximum slot cycle, the phase of a mobile station's slots is determined according to a "hashing function" that effectively randomizes the phases of all mobile stations such that, on average, no one slot is assigned to more mobile stations than any other slot. During each of a mobile station's slots, it will scan the paging channel for any possible messages (i.e., pages). The duration of the scan is typically 80-120 ms, although longer scans are possible depending on whether a message has been sent, the length of the message, and the RF conditions on the mobile station's forward link, among other factors.

Accordingly, a radio access network may be configured to page a mobile station by transmitting a page message via a paging channel. In an exemplary embodiment, a network (e.g., the BTS, BSC, and/or MSC) will typically receive an indication that a mobile station should be paged (e.g., an incoming call directed to the mobile station), which includes an identifier of the mobile station, such as a MIN or IMSI. Responsive to receiving the incoming call for the mobile station, the RAN may include a page to the mobile station in a page message. For example, when a base station receives an incoming call for a mobile station in its coverage area, it may determine the mobile station's assigned timeslot. The base station may then page the mobile station during the assigned timeslot, such as by including the page in page message, which the base station typically generates prior to the assigned timeslot (preferably during the immediately preceding time slot) and transmits during the assigned timeslot.

The page message may take the form of a general page message (GPM). As such, the RAN may use the MIN or IMSI as a basis to determine the carrier air interface (CAI) transmit address fields, and encode these fields into a page record, which may then be placed in a general page message (GPM) for transmission in the zone in which the mobile station is registered (and possibly other zones as well). The page record may take other forms as well.

Further, the RAN may be configured to create a page message that includes multiple page records for multiple mobile stations, such that multiple mobile stations can be paged using a single page message. To do so, page records may be concatenated so that more page records may be included in a page message than otherwise could be. For example, at least eight page records may be concatenated in a single GPM. Other concatenation techniques are also possible.

Without concatenation, a GPM, which occupies two half frames (i.e., one timeslot) in the paging channel, typically cannot include more than four page records. In comparison, a GPM in which two page records are concatenated can be sent in two to three half frames, which allows for at least five page records to be sent in a single timeslot. Further, in some cases, two to eight page records can be concatenated and sent in two to eight half frames, which allows a base station to transmit at least eight page records in a timeslot.

Concatenating page records into a GPM may reduce the load on the paging channel, thereby helping to reduce paging channel occupancy (PCO). When multiple page records are concatenated in a GPM, some information which is typically included in a page is not repeated for each page record. For example, length bits, overhead bits, CRC bits, and reserved bits, are not repeated for each page record in a GPM. When more page records are being concatenated into the same 80 ms slot and information is removed, there may be a performance tradeoff as some page records may fail to reach their intended mobile stations (i.e., there may be a reduction in the paging-success rate (PSR)).

2. Exemplary IS-856 Functionality

IS-856 leverages the asymmetric characteristics of most IP traffic, in which the forward link typically carries a higher load than the reverse link. Under IS-856, each mobile station maintains and manages an active set of sectors from which the mobile station receives a pilot signal, but receives forward-link transmission from only one active sector at a time. In turn, each sector transmits to all its active mobile stations on a common forward link using time division multiplexing (TDM). The reverse link under IS-856 retains largely the traditional IS-2000 code division multiplexing (CDM) format, albeit with the addition of a "data rate control" (DRC) channel used by the mobile station to indicate the supportable data rate and best serving sector for the forward link. As a result of the full-power allocation by the sector, a mobile station operating under IS-856 can, in theory, receive packet-data at a rate of at least 38.4 kbps and up to 2.4 Mbps.

TDM access on the IS-856 forward link is achieved by dividing the forward link in the time domain into timeslots of length 2048 chips each. At a chip rate of 1.228 Mega-chips per second, each slot has a duration of 1.67 milliseconds (ms). Each time slot is further divided into two 1024-chip half-slots, each half-slot arranged to carry a 96-chip pilot "burst" (pilot channel) at its center and a Medium Access Control (MAC) channel in two 64-chip segments, one on each side of the pilot burst. The remaining 1600 chips of each time slot (800 per half-slot) are allocated for a forward traffic channel or a forward control channel, so that any given time slot will carry either traffic-channel data (if any exists) or control-channel data.

Under IS-856, a given mobile station receives pages and other control messages from the RAN on a control channel that is time-division multiplexed with traffic channels to individual mobile stations, as mentioned above, and described in further detail below. EVDO control messages may include system information broadcast to all mobile stations having active data sessions, as well as page messages directed to specific mobile stations. Page messages are used to send information, alerts, and requests requiring responses. For instance, a mobile station is alerted of an incoming Voice over IP (VoIP) call or push-to-talk session via a page message. For purposes of the discussion herein, an EVDO control message carrying system information shall be referred to as an "EVDO control-channel message," while an EVDO control message carrying a page message shall be referred to as an "EVDO paging message." It may be possible for a single EVDO control message to carry both an EVDO control-channel message and an EVDO paging message. EVDO control-channel messages and EVDO paging messages can be considered examples of the more generally-termed control messages discussed above.

Both control messages and user-specific data, such as email, VoIP media, push-to-talk messages, and other data and media services, are assembled into link-layer packets, which are then subdivided into time-slot segments and scheduled for transmission in timeslots on the forward link. As discussed above, "traffic packets" carry "traffic-channel data" that is transmitted in "traffic-channel timeslots," and "control packets" carry "control-channel data" that is transmitted in "control-channel timeslots." In EVDO communications (i.e., under IS-856), a control packet is an EVDO physical-layer control-data packet. As is known in the art, such a packet can contain a partial EVDO control message, a whole EVDO control message, or more than one EVDO control message. Again, the designations of traffic data, control data, and the like are used herein as a convenience in identifying the type of data carried in any given time slot; the formats of both designated types of timeslots are otherwise the same.

In practice, the RAN transmits control messages, such as pages, to mobile stations during periodically-recurring 12-cycle control-channel periods, as described above. Each 12-cycle control-channel period comprises 12 consecutive "EVDO control-channel cycles," such that any given one of the EVDO control-channel cycles recurs once every $12^{th}$ cycle. EVDO control-channel cycles can be considered examples of the more generally-termed control-channel cycles discussed above. The RAN schedules transmission of control messages to occur in the periodic recurrences of each control-channel cycle. While mobile stations may receive certain control messages during more than one control-channel cycle of a recurrence of the 12-cycle control-channel period, page messages for any given mobile station are sent only during a mobile-station-specific one of the recurring control-channel cycles.

More particularly, a "hashing function" executed by the RAN and/or by mobile stations may be used to assign each mobile station to a specific control-channel cycle within the recurring 12-cycle control-channel period. In turn, the mobile station then monitors each periodic recurrence of its assigned control-channel cycle for page messages. The hashing function effectively randomizes the assignments of mobile stations to the control-channel cycles such that, on average, no one cycle is assigned more mobile stations than any other cycle. In this sense, each mobile station is "eligible" to receive control messages at least during its assigned control-channel cycle, and possibly during other cycles as well.

Forward-link transmissions are grouped in frames, each frame being 16 timeslots in length, and every 16 frames comprising one control-channel cycle. Each control-channel cycle therefore contains 256 timeslots. Since each time slot is 1.67 ms in duration, each control-channel cycle spans 426.67 ms, and each 12-cycle control-channel period spans 5.12 seconds. Put another way, each control-channel cycle recurs with a period of 5.12 seconds, so that a given mobile station monitors for page messages from the RAN every 5.12 seconds, when the mobile station's assigned control-channel cycle recurs. Note that scheduling of traffic packets is not generally tied to any particular control-channel cycle, so that traffic-channel timeslots for a given mobile station can occur largely anywhere during a 12-cycle control-channel period (though possibly subject to other scheduling constraints).

Figure 2:
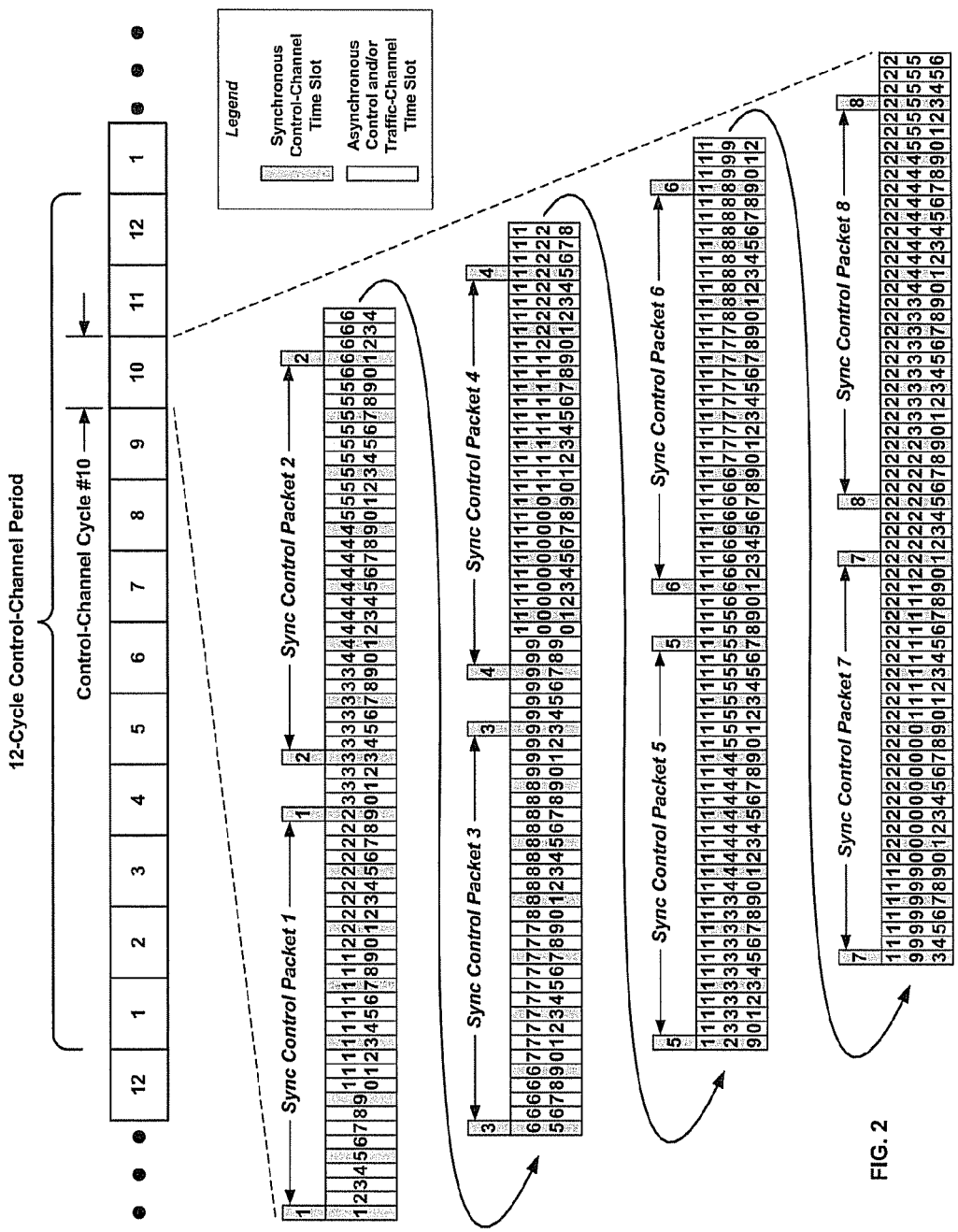
FIG. 2 is a simplified block diagram illustrating the arrangement of timeslots in control-channel cycles.

FIG. 2 illustrates the arrangement of timeslots in control-channel cycles described above. At the top of the figure, a 12-cycle control-channel period is depicted with control-channel cycles numbered 1, 2, 3, . . . , 12. Also shown are the last cycle (#12) of the immediately preceding period and the first cycle (#1) of the immediately following period. These last and first control-channel cycles (as well as leading and trailing ellipses) are meant to represent the periodic recurrence of the 12-cycle control-channel periods.

The organization of timeslots is shown below the 12-cycle control-channel period, with control-channel cycle #10 taken as an example. The following discussion could apply to any of the other control-channel cycles as well. Cycle #10 is magnified to show all 256 timeslots, and in order to fit on one page, the magnified view is broken into four segments: timeslots {1-64}, {65-128}, {129-192}, and {193-256}; s-shaped arrows indicate the contiguity between the segments. Dashed lines connect the start and end of the cycle in the top view with the extent of the cycle in the magnified view. The timeslots in the magnified view are numbered 1, 2, 3, ..., 256, and as indicated by the "Legend" at the right of the figure, synchronous control-channel timeslots are shown in gray, while asynchronous control-channel timeslots and/or traffic-channel timeslots are shown in white.

3. Exemplary Systems for Scheduling Pages

An exemplary system may be configured to adjust the scheduling and transmission of pages depending upon sector load. In particular, when generating a page message for a given paging period (or possibly when an indication to page a mobile station is received and/or when the page is initially scheduled), the base station may determine that the paging period is overloaded, and reschedule one or more pages from the overloaded period to a later paging period. Using similar functionality, when an indication to page a mobile station is received and a page is initially scheduled, the base station may determine that the mobile station's assigned paging period is overloaded, and instead schedule the page for a later paging period and/or reschedule one or more other pages from the assigned period to a later paging period.

It should be understood that a paging period may take various forms. For example, under IS-2000, a "period" typically takes the form of a paging timeslot on the paging channel. As another example, under IS-856, a "period" may take the form of a control-channel cycle. Other forms are also possible. Furthermore, description herein of IS-2000 embodiments with reference to a "timeslot" (e.g., to a mobile station's assigned timeslot) should be understood to also apply to a control-channel cycle (e.g., to a mobile station's assigned control-channel cycle) in the context of IS-856, and vice versa.

Figure 3:
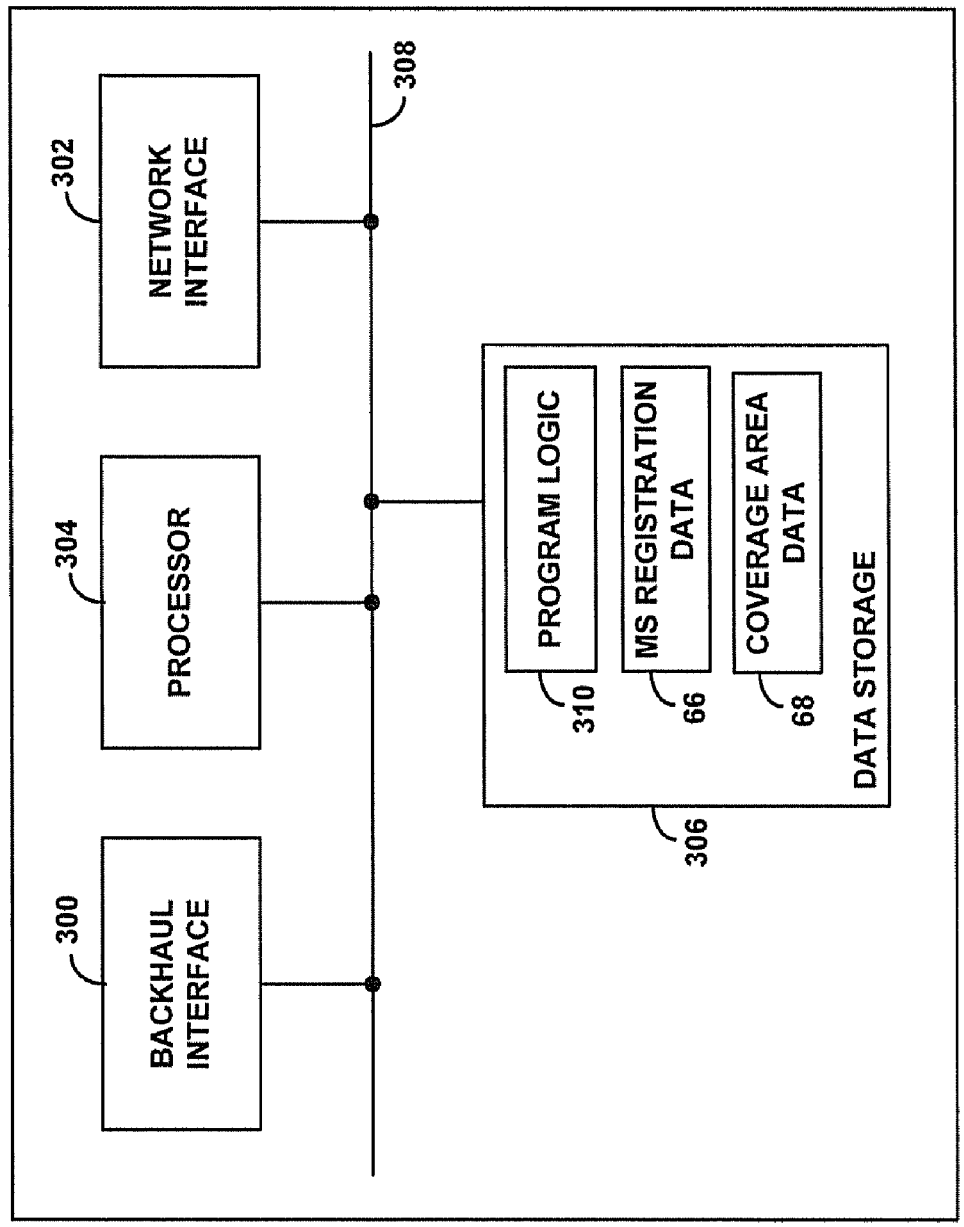
FIG. 3 is a simplified block diagram showing functional components of an exemplary base station.

FIG. 3 is a simplified block diagram showing functional components of an exemplary base station 300 in a RAN, or any other entity arranged to carry out analogous functions. As shown, the base station includes a backhaul interface 300, a network interface 302, a processor 304, and data storage 306, all of which may be communicatively linked together by a system bus, network, or one or more other connection mechanisms 308. Backhaul interface 300 may comprise any sort of communication link, interface, or mechanism enabling the base station to exchange signaling and bearer data with other RAN entities. Network interface 302 may comprise any sort of interface enabling the base station to exchange signaling and bearer data for PSTN communication and perhaps to access mobile station registration data 66 and/or coverage data 68 if the data is accessible in that manner.

Processor 304 may comprise one or more processors (e.g., general purpose and/or special purpose processors), such as microprocessors for instance. And data storage 306 may comprise one or more volatile and/or non-volatile storage components, such as magnetic, optical, or organic storage components, integrated in whole or in part with processor 304. Further, data storage 306 may contain the mobile station registration data 66 and/or the coverage area data 68, such as a copy of part or all of that data, for convenient access by the MSC processor 304.

As further shown, data storage 306 preferably contains program logic (e.g., machine language instructions) 310 executable by processor 304 to carry out various functions described herein. For example, the program logic may be executable to (i) prior to a first paging period, determine whether or not a load during the first paging period exceeds a threshold load, wherein the load comprises one or more pages to mobile stations, (ii) if the load during the first paging period exceeds the threshold load, then reschedule at least a portion of the load from the first paging period to a second paging period, and (iii) otherwise, refrain from rescheduling the portion of the load.

As another example, the program logic may be executable to (i) determine whether or not paging the mobile station during the assigned paging period would result in a load during the assigned paging period exceeding a threshold load, (ii) if the load during the assigned paging period would exceed the threshold load, then scheduling a page to the mobile station for transmission during a later paging period occurring after the assigned paging period, and (iii) otherwise, scheduling the page to the mobile station for transmission during the assigned paging period.

4. Exemplary Methods for Page Scheduling

Figure 4:
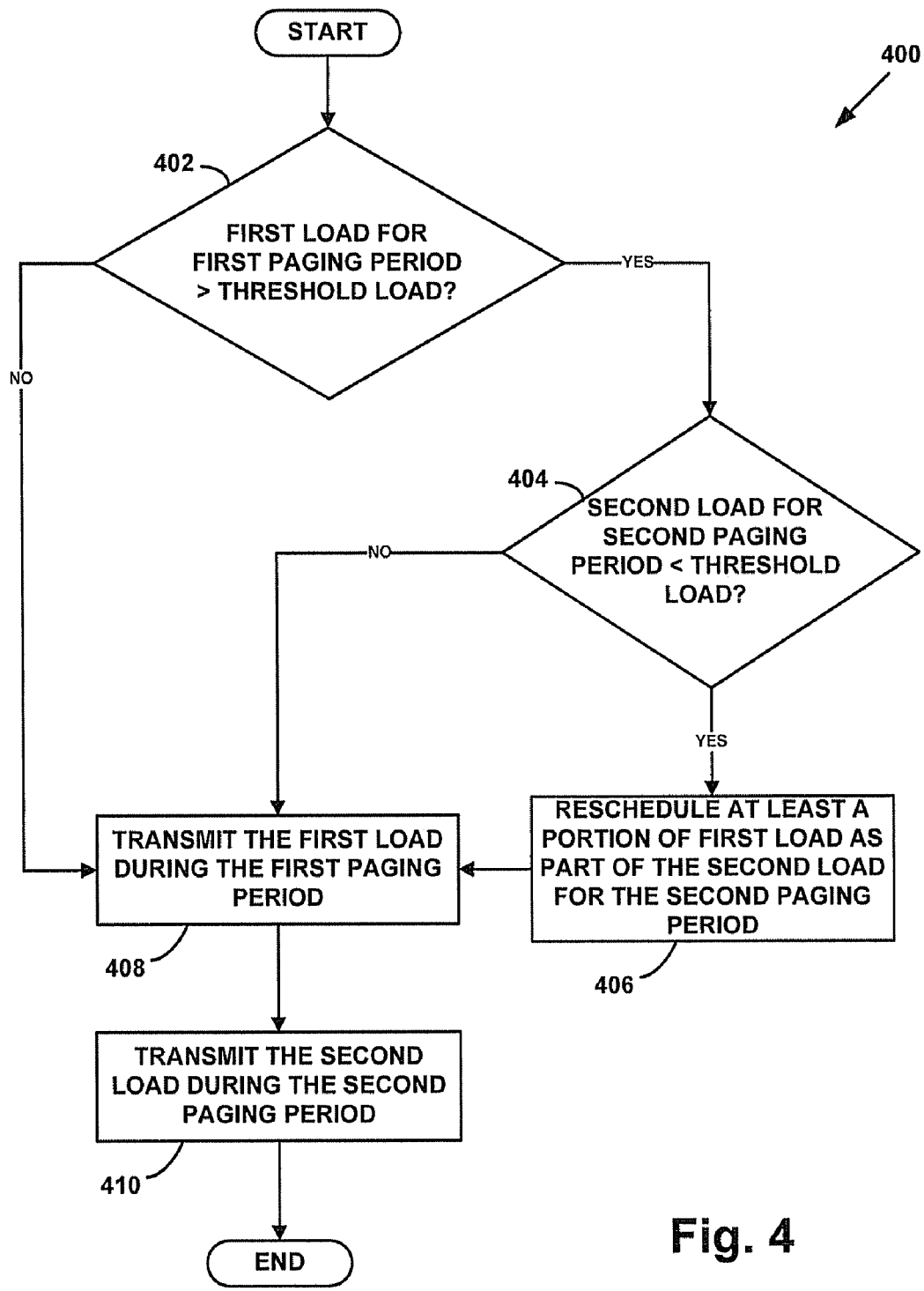
FIG. 4 is a flow chart illustrating an exemplary method, which may be used to schedule pages in a radio access network.

FIG. 4 is a flow chart illustrating an exemplary method 400, which may be used to schedule pages in a radio access network. The exemplary method may be carried out at a radio access network; i.e., by one or more entities of a RAN and/or entities having access to or in communication with a RAN, in order to schedule pages to mobile stations based on sector loading. In particular, the method is described as carried out by a base station (e.g., a BTS and/or BSC). However, it should be understood that other entities may also carry out the method, or portions thereof, without departing from the scope of the invention.

The method 400 involves the RAN determining whether or not a first load, which is scheduled for transmission during a first paging period, is greater than a threshold load, as shown by block 402. If the first load is greater than the threshold load, then the network proceeds to determine whether or not a second load, which is scheduled for transmission during a second paging period, is less than the threshold load, as shown by block 404. If the second load is less than the threshold load, then the network reschedules at least a portion of the first load for transmission during the second paging period, as shown by block 406. Otherwise, the network refrains from rescheduling the portion of the first load for transmission during the second paging period.

The network then transmits the first load during the first paging period, as shown by block 408, and subsequently transmits the second load during the second paging period, as shown by block 410. In the event that the network has rescheduled a portion of the first load for transmission during the second paging period, the first load does not include the rescheduled portion, as this portion is now included as part of the second load that is transmitted during the second paging period. On the other hand, if the first load is less than the threshold load less than the threshold load, the first load typically remains scheduled and is transmitted as it otherwise would be.

If the first and second loads are both greater than the threshold load, then the method may further involve checking subsequent periods until the network finds a period that is not overloaded. In this scenario, the network may then reschedule the portion of the first load for transmission during a subsequent period that is not overloaded. Other procedures for handling consecutive overloaded periods are also possible. Further, it should be understood that while first and second paging periods are typically consecutive periods, the first and second periods may also be separated by one or more paging periods, without departing from the scope of the invention.

In an exemplary embodiment, each page may take the form of a page record intended for a particular mobile station, which is concatenated and transmitted in a GPM. Thus, rescheduling a page from the first load to the second load may involve including at least one page record in a second GPM scheduled for the second timeslot, rather than in a first GPM scheduled for the first timeslot.

The load in each period may simply be defined as the paging-channel occupancy for the paging period, which is typically defined by the number and/or size of the pages that are scheduled for the timeslot, as well as the number and/or size any overhead messages (ACK messages, etc.) scheduled for transmission during the period. As an example, when a base station is creating a GPM for a certain timeslot, the base station may determine how many pages can be sent in the timeslot. The base station may do so by first determining how much bandwidth is required for scheduled overhead messages, which in practice, typically occupies the majority of available bandwidth. For instance, the base station may subtract the size of the scheduled overhead messages from the 1528 bits available in the typical 80 ms paging timeslot (where data is transmitted at 9.6 kb/sec). The base station may then determine how many pages may be sent given the remaining bandwidth. This determination may be based on the typical size of 72 bits (plus addressing bits) for each page record. In practice, there typically is bandwidth available for 8-10 pages in a given timeslot, although this number may vary, without departing from the scope of the invention. Further, other techniques for determining the load in a given paging period are also possible.

In a further aspect, when the network reschedules a portion of the first load for later transmission, the network may send an overflow indicator. The overflow indicator indicates to a mobile station that is assigned to the first paging period, that if the mobile station does not receive a page during its assigned period (i.e., the first paging period), the mobile station should listen for a page during the second paging period. As such, mobile stations may be informed when pages have been rescheduled. In an exemplary embodiment, the overflow indicator takes the form of an overflow indicator bit, which may be included in a GPM during the first paging timeslot (when a portion of the first load is rescheduled). For instance, a GPM may include eight reserved bits. Any of these eight reserved bits may be used as the overflow indicator bit. The overflow indicator may take other forms as well.

Rescheduling a portion of the load from the first paging period to the second, typically involves rescheduling one or more pages. The pages may be selected at random, or in another manner, as a matter of engineering design choice. For example, pages could be rescheduled based on the quality-of-service (QoS) priority of the mobile stations for which the pages are intended. In particular, users may enroll in different service plans providing different QoS priority, and those with lower QoS priority may then be rescheduled first. As another example, pages could be rescheduled based on communication or application-type (e.g., based on the communication or application the page is intended to initate). And as another example, pages could be rescheduled based on paging attempt status (i.e., how many previous attempts to transmit the page have been made without success). Other examples are also possible.

FIG. 5 is another flow chart illustrating an exemplary method 500, which may be used to schedule pages in a RAN. The method 500 involves the RAN receiving an indication that a page to a mobile station should be transmitted (e.g., receiving an incoming call or SMS message for the mobile station), as shown by block 502. The RAN then determines whether or not paging the mobile station during its assigned paging timeslot will result in the load (i.e., PCO) during the assigned timeslot exceeding a threshold load, as shown by block 504. If the load would be greater than the threshold load, then the RAN schedules the page to the mobile station for transmission during a second paging timeslot occurring after the mobile station's assigned paging timeslot, as shown by block 506. Otherwise, the RAN schedules the page for transmission during the assigned timeslot, as shown by block 508.

In this embodiment, the load may be determined prior to generating the GPM for the assigned timeslot (i.e., when the page is initially received and scheduled). Thus, it should be understood that the determined PCO may be an estimate, rather than an exact calculation, as it is possible that overhead messages and/or other pages may be scheduled subsequent to determining the PCO, but prior to generating the GPM for the assigned timeslot.

In general, it should be understood that a base station may determine the load in a given timeslot when initially scheduling a page for that timeslot, as in method 500 of FIG. 5, or later, when the base station is generating the paging message including pages that have already been scheduled for the timeslot, as in method 400 of FIG. 4. When a base station determines a paging timeslot is overloaded during the initial scheduling of a page for that timeslot, the base station may responsively schedule the page for transmission in a later timeslot (and/or reschedule other pages that have already been scheduled). When the base station determines a timeslot is overloaded when generating a GPM for the timeslot (i.e., not responsive to the scheduling of a particular page), one or more page that have already been scheduled may be rescheduled for the later timeslot (e.g., not included in the GPM for the assigned timeslot). In either scenario, the base station may also include an overflow indicator bit in a GPM transmitted in the mobile station's assigned timeslot, indicating that the mobile station should listen for a page in the later timeslot.

Exemplary methods may further involve, if it is determined that a given paging period is overload, actively selecting the later paging period in which to transmit the page. For instance, the base station may determine whether the load in the later paging timeslot exceeds the threshold load and, if it does not, schedule the page for the later timeslot. However, if transmitting the page in the later paging timeslot would overload the later paging timeslot, then the base station may repeat this process for other paging timeslots until a paging timeslot without a load exceeding the threshold load is located. Preferably, the RAN selects the next-available paging timeslot, after the assigned paging timeslot, during which the mobile station can be paged without overloading the timeslot (i.e., without causing the load to exceed the threshold load). Thus, an exemplary method may involve the base station first evaluating the load in the paging timeslot that immediately follows the mobile station's assigned paging timeslot. Then, if this next immediate paging timeslot is overloaded, the base station may consecutively evaluate the following paging timeslots, until it locates the next-available paging timeslot having a scheduled load that is less than the threshold load. It should be understood, however, that the later timeslot may be selected in another manner as well, as a matter of engineering design choice, without departing from the scope of the invention.

Exemplary embodiments of the present invention have been described above. It should be understood the word "exemplary" is used herein to mean "serving as an example, instance, or illustration." Any embodiment described herein as "exemplary" is not necessarily to be construed as preferred or advantageous over other embodiments. In addition, those skilled in the art will understand that changes and modifications may be made to these exemplary embodiments without departing from the true scope and spirit of the invention, which is defined by the claims.

We claim:

1. A method comprising:
a radio access network component determining whether or not a first load that is scheduled for transmission during a first paging period, is greater than a threshold load;
if the first load is greater than the threshold load, then the radio access network component:
  determining whether or not a second load that is scheduled for transmission during a second paging period, is less than the threshold load; and
  if the second load is less than the threshold load, then rescheduling at least a portion of the first load for transmission during the second paging period; and
otherwise, the radio access network component refraining from rescheduling the portion of the first load for transmission during the second paging period.

2. The method of claim 1, further comprising:
transmitting the first load, other than any portion of the first load that has been rescheduled for the second paging period, during the first paging period; and
transmitting the second load, including any portion of the first load rescheduled for the second paging period, during the second paging period.

3. The method of claim 1, wherein the first load initially comprises one or more pages to one or more mobile stations, wherein the second load initially comprises one or more pages to one or more mobile stations, and wherein rescheduling at least a portion of the first load for transmission during the second paging period comprises:
rescheduling at least one of the pages from the first load for transmission as part of the second load during the second paging period.

4. The method of claim 3, wherein each page comprises a page record, and wherein the first page message comprises a first general page message (GPM), and wherein the second page message comprises a second GPM.

5. The method of claim 4, wherein rescheduling at least a portion of the first load for transmission as part of the second load during the second paging period comprises including a page record in the second GPM that would otherwise have been included in the first GPM.

6. The method of claim 1, wherein the second paging period immediately follows the first paging period.

7. The method of claim 1, wherein the second paging period is a period after at least one period following the first paging period.

8. The method of claim 1, further comprising, repeating the method of claim 1 for every period.

9. The method of claim 1, further comprising, if the second load is less than the threshold load and the portion of the first load is rescheduled for transmission during the second paging period, then transmitting an overflow indicator during the first paging period to indicate that the portion of the first load has been rescheduled.

10. The method of claim 9, wherein the overflow indicator comprises an overflow indicator bit included in a GPM.

11. A method comprising:
at a radio access network, receiving an indication to page a mobile station, wherein the mobile station has an assigned paging period;
determining whether or not paging the mobile station during the assigned paging period would result in a load during the assigned paging period exceeding a threshold load;
if the load during the assigned paging period would exceed the threshold load, then scheduling a page to the mobile station for transmission during a later paging period occurring after the assigned paging period; and
otherwise, scheduling the page to the mobile station for transmission during the assigned paging period.

12. The method of claim 11, wherein the load during the assigned paging period comprises one or more pages scheduled for transmission during the assigned paging period.

13. The method of claim 11, further comprising, if the load during the assigned paging period would exceed the threshold load, selecting the later paging period.

14. The method of claim 13, wherein the selecting the later paging period comprises selecting a next-available later paging period in which the page to the mobile station can be transmitted without causing a load in the next-available later paging period to exceed the threshold load.

15. The method of claim 1, wherein each paging periods comprises an IS-2000 paging timeslot or an IS-856 control-channel cycle.

16. A system comprising:
at least one communication interface configured to page mobile stations;
program logic stored in data storage, wherein the program logic is executable by at least one processor to:
  prior to a first paging period, determine whether or not a load during the first paging period exceeds a threshold load, wherein the load comprises one or more pages to mobile stations;
  if the load during the first paging period exceeds the threshold load, then reschedule at least a portion of the load from the first paging period to a second paging period; and
  otherwise, refrain from rescheduling the portion of the load.

17. The system of claim 16:
wherein the communication interface is configured to receive an indication to page a mobile station; and
wherein the program logic stored in data storage is further executable by the processor to identify a paging period that is assigned for paging the mobile station; and
wherein, to determine whether or not a load during the first paging period exceeds a threshold load, the program logic stored in data storage is executable by the at least one processor to determine whether or not paging the mobile station during the assigned paging period would result in a load during the assigned paging period exceeding a threshold load.

18. The system of claim 16, wherein, to reschedule at least a portion of the load from the first paging period to the second paging period, the program logic stored in data storage is executable by the at least one processor to reschedule one or more pages from the first paging period to the second paging period.

19. The system of claim 16, wherein the paging period comprises an IS-2000 paging timeslot or an IS-856 control-channel cycle.

20. The system of claim 16, wherein the program logic is further executable by the at least one processor to, if the load during the first paging period exceeds the threshold load, transmit an overflow indicator during the first paging period.

* * * * *